United States Patent [19]

Beristain

[11] Patent Number: 4,530,029
[45] Date of Patent: Jul. 16, 1985

[54] CAPACITIVE PRESSURE SENSOR WITH LOW PARASITIC CAPACITANCE

[75] Inventor: Charles D. Beristain, West Hartford, Conn.

[73] Assignee: United Technologies Corporation, Hartford, Conn.

[21] Appl. No.: 588,584

[22] Filed: Mar. 12, 1984

[51] Int. Cl.³ .............................................. H01G 7/00
[52] U.S. Cl. ................................... 361/283; 29/25.42; 73/718
[58] Field of Search .......................... 361/283; 73/718; 29/25.42

[56] References Cited

U.S. PATENT DOCUMENTS 3,292,059 12/1966 Woods ................................ 361/283
4,292,659 9/1981 Lao ..................................... 361/283
4,388,668 6/1983 Bell et al. .

Primary Examiner—Donald A. Griffin
Attorney, Agent, or Firm—Francis J. Maguire, Jr.

[57] ABSTRACT

A plurality of two-plate capacitive pressure sensors with low parasitic capacitance and easily accessible plates are made with microcircuit and thin film technology by depositing a thin layer of glass over a plurality of thin, rigid plates and thin, narrow electrodes previously deposited on a thick glass dielectric substrate, by etching cavities in the thin layer of glass over the plates, and by anodically bonding, in vacuum, thin, doped silicon diaphragms to the thin layer of glass to form variable capacitors each of whose capacitance varies with the pressure outside the sensor.

2 Claims, 11 Drawing Figures

CAPACITIVE PRESSURE SENSOR WITH LOW PARASITIC CAPACITANCE

TECHNICAL FIELD

This invention relates to capacitive pressure sensors, and more particularly to capacitive pressure transducers having a semiconductor diaphragm separated from a glass substrate by a glass wall.

BACKGROUND ART

A variety of capacitive pressure sensor types are known. These include a two-plate type that utilizes at least one flexible diaphragm as a plate of a parallel plate capacitor. The other plate may also be flexible, but most devices have a rigid second plate separated from the flexible diaphragm by a narrow space. The separation between the plates (with the diaphragm unflexed) is usually determined by the height of a wall between the diaphragm and the rigid plate which serves both to separate the plates and to enclose the space between them. It is necessary to seal the enclosed space, usually in vacuum, in order to provide a reference pressure on one side of the flexible diaphragm.

A specific example of the two-plate flexible diaphragm type is disclosed in U.S. Pat. No. 4,178,621, "Electromechanical Pressure Transducer" granted to Simonelic and assigned to Motorola, Inc. The diaphragm and the substrate (for mounting the rigid plate-)in the Simonelic device are separated by a wall consisting of an annular ring of insulating glass around the periphery of the device. Simonelic further discloses the use of a relatively thin ceramic disc and a relatively thick ceramic base for use, respectively, as a diaphragm and a substrate. Both the ceramic disc and the ceramic base have metallic surfaces deposited thereon for use as capacitive plates. Each metallic surface has a projecting conductive "finger" associated therewith for external electrical connection to a circuit which senses changes in the capacitance between the plates. The rigid plate's "finger" extends radially from the central plate area and passes under the glass ring, and the flexible plate's "finger" similarly passes over the glass ring. The device is sealed by subjecting the assembly to a high temperature, at which point the glass ring softens, thereby bonding the diaphragm to the substrate.

The sealing method employed for such a device is more fully disclosed in column 4, lines 58-61 of U.S. Pat. No. 4,345,299, "Capacitive Pressure Transducer Assembly With Improved Output Lead Design", granted to Ho and also assigned to Motorola, Inc. The glass ring is a silk screened "thick film paste comprising glass frit particles" which is "fired" at high temperature to join the diaphragm to the base substrate.

A similar sealing method is disclosed in even more detail in U.S. Pat. No. 4,184,189, "Capacitive Pressure Sensor and Method of Making It", granted to Davis and also assigned to Motorola, Inc. The Davis patent discloses a glass diaphragm and a glass substrate joined by a glass ring. Sifted ground glass is "mixed into a paste for screen printing. The paste is prepared by mixing the ground glass with a binder and an organic solvent . . . [which is] then screen printed on the base glass . . . [dried] . . . and heated . . . to remove the binder." (See column 4, line 58 to column 5, line 6). After evacuating the furnace, heating and cooling the device, mounting the diaphragm on shims that determine the spacing between the diaphragm and the base (about 0.013 to 0.051 mm), a 75 gram weight is placed on top of the assembly which is placed in an evacuated (about 100 mm Hg) furnace and is "heated to 500° C. for thirty minutes during which time the sealing glass mixture flows and seals together the base and diaphragm." (See column 5, lines 18-21).

The method of providing plate electrodes which emerge radially as "fingers" from the central plate areas under, over, or through the glass frit seal is a simple way of "getting at" the otherwise inaccessible capacitor plates (within the evacuated chamber) for electrical connection to external circuitry for measurement of capacitive changes. The method is well-known, as may be seen in various other U.S. Pat. Nos., including: U.S. Pat. No. 4,287,553 "Capacitive Pressure Transducer", granted to Braunlich, U.S. Pat. No. 4,292,659, "Pressure Sensing Capacitive Transducer", granted to Lao, both assigned to The Bendix Corporation; U.S. Pat. No. 4,207,604, "Capacitive Pressure Transducer With Cut-Out Conductive Plate", and U.S. Pat. No. 4,388,668, "Capacitive Pressure Transducer", both granted to Bell et al, and both assigned to Kavlico Corporation.

A limitation of the glass frit sealing method used in all of the above U.S. patents is that it can only be used for sealing relatively large devices, i.e. devices having a diameter of about 2-3 centimeters or more (the capacitive devices are usually planar capacitors, typically having a right circular cylindrical shape with a radius much larger than its height). The minimum capacitive gap distance achievable with the glass frit sealing method is not particularly narrow. Since the closer the plates are, the higher is the capacitance therebetween, the lack of narrowness in the gap must be compensated for (for a given capacitive requirement) by increasing the area of the capacitor plates (the capacitance of a parallel plate capacitor is directly proportional to the area of the plates and inversely proportional to the distance therebetween). Another limitation of the glass frit method is that the devices must usually be made one at a time.

A method for manufacturing a plurality of miniature (on the order of 5 mm) two-plate capacitive pressure transducers is disclosed in U.S. Pat. No. 4,261,086, "Method for Manufacturing Variable Capacitance Pressure Transducers", granted to Giachino et al, and assigned to Ford Motor Company. The method comprises the steps of (1) forming a plurality of spaced recesses (for use as capacitor plate diaphragms) in the surface of a semiconductor wafer, (2) doping the semiconductor wafer to enhance its electrical conductivity, (3) forming spaced areas of electrically conductive material on a surface of a dielectric material (for use as rigid capacitor plates), and (4) attaching the surface of the semiconductor wafer to the surface of the dielectric such that each of the recessed diaphragms covers one of the rigid plates in substantially parallel alignment. The detailed description in the patent discloses that the bonding of the wafer to the dielectric may be accomplished with the use of an anodic bonding technique (see column 6, lines 3-14).

In the Giachino device, access to the capacitor plates for external electrical connection is made through conductive holes formed in the dielectric. (See column 5, lines 15-68, and column 6, lines 1-3). The holes are made using ultrasonic, abrasive, or laser drilling techniques and are made conductive by depositing a metallo-organic solution in the holes and drying. The metallic salt residue left on the surfaces of the holes is heated, causing decomposition of the salts into a metal film that is electrically conductive. If desired, either one or both of the holes is sealed by melting solder which flows by capillary action into the holes. Solder "bumps" are then formed at the hole entrance for external electrical connection (see column 5, lines 26–46). The wafer is then cut to produce individual capacitive pressure transducer assemblies. See also related U.S. Pat. No. 4,277,814 "Semiconductor Variable Capacitance Pressure Transducer Assembly", granted to Giachino et al, and No. 4,386,453, "Method for Manufacturing Variable Capacitance Pressure Transducers", also granted to Giachino et al, both assigned to Ford Motor Company. A limitation in all of the Giachino patents is the relatively complex hole drilling, metal salting of the holes, and hole solder-sealing required to gain access to the capacitor plates for external electrical connection. The simpler method of using a projecting conductive "finger" is not used to gain access to the rigid plate inside the chamber as in the frit glass structures because the anodic bonding technique cannot be successfully used to bond metal to silicon.

Another miniature two-plate capacitive pressure sensor structure is disclosed in U.S. Pat. No. 4,405,970, "Silicon-Glass-Silicon Capacitive Pressure Transducer", granted to Swindal et al, and assigned to the owner of this patent application. In that patent, the techniques used in fabricating active semiconductor devices and in thin film technology are applied to fabricate a plurality of devices from a single substrate, each having a silicon diaphragm mounted over a silicon substrate and separated by a layer of glass. The diaphragm and substrate are doped to make them conductive. A layer of glass supports each diaphragm in parallel alignment over an associated glass or silicon pedestal (with or without metalization) formed on the silicon substrate. The pedestals are used to decrease the parasitic capacitance that would otherwise exist between and in the vicinity of the joined surfaces around the periphery of each device. These devices are particularly well suited for miniaturization because of the fine dimensional control achievable using the semiconductor and thin film technologies. However, despite the use of pedestals, moats, etc., parasitic capacitance remains to some degree. See also a related U.S. Pat. No. 4,415,948, "Electrostatic Bonded, Silicon Capacitive Pressure Transducer", granted to Grantham et al, also assigned to the owner of this patent application.

A miniature three-plate capacitive pressure sensor that helps solve the parasitic capacitance problem, described above in connection with the Swindal and Grantham two-plate sensors, is disclosed in pending U.S. patent application No. 527,531, owned by the owner of this patent application. In the three-plate device, several layers of a glass dielectric of borosilicate glass are deposited on a doped silicon substrate. In between the glass layers a central rigid conductive capacitor plate is deposited, along with a projecting conductive "finger" for external electrical connection. A doped silicon diaphragm is field assisted bonded in vacuum to a glass wall around the periphery of each device. The reason for using the several layers of glass dielectric between the silicon substrate and the silicon diaphragm is to create an additional parasitic capacitance between the silicon substrate and the central rigid plate and its associated "finger" electrode which is in series with the parasitic capacitance between the substrate and the diaphragm. By connecting a "Capacitive Pressure Transducer Signal Conditioning Circuit", as disclosed in pending U.S. patent application Ser. No. 527,530, also owned by the owner of this patent application, between the diaphragm, the substrate, and the central capacitor plate (by means of the "finger" electrode), the parasitic capacitances between the diaphragm and the substrate and between the central plate and the substrate may be cancelled electrically. The remaining variable capacitance between the diaphragm and the central plate is then substantially free of the parasitic capacitance masking effects. The three-plate device is also particularly advantageous because of its use of a projecting "finger" electrode which passes out from the central plate, through two of the glass layers, and out to the periphery of the device. Part of the diaphragm and several of the glass layers are etched away to expose the electrode's contact surface.

DISCLOSURE OF INVENTION

The objects of the present invention are to provide a two-plate capacitive pressure sensor structure that reduces parasitic capacitance to a minimum and to provide plate connections that are simply fabricated.

According to the present invention, a capacitive pressure sensor includes a thin but rigid capacitor plate deposited on a thick glass dielectric substrate, a thin layer of glass dielectric deposited on top of the deposited capacitor plate and substrate and having a cavity created within said glass dielectric layer over the deposited plate while, at the same time, leaving a wall of glass around the periphery of the device for mounting a thin doped silicon diaphragm over the cavity and sealing the silicon diaphragm to the top of the wall using high temperature and an electrostatic field to hermetically seal the cavity in vacuum, thereby creating a parallel plate capacitor having one plate that flexes inwardly toward the deposited capacitor plate in the presence of fluid pressure outside the device greater than vacuum.

In further accord with the present invention an associated thin electrode finger is deposited along with the deposited capacitor plate on the substrate before having the thin glass dielectric layer deposited thereon, thereby providing an electrical connection to the deposited capacitor plate which passes, fingerlike, under the glass wall, thereby facilitating electrical connection to any external circuit in which the sensor may be utilized.

The capacitive pressure sensor of the present invention has very low parasitic capacitance. It achieves this by using a glass dielectric substrate in conjunction with the techniques utilized in the three-plate device described above in the background art section. As a result, an inexpensive, commercially viable device is fabricated with the extremely useful finger electrode feature of the three-plate device while at the same time virtually eliminating parasitic capacitance.

BEST MODE FOR CARRYING OUT THE INVENTION

Figure 1:
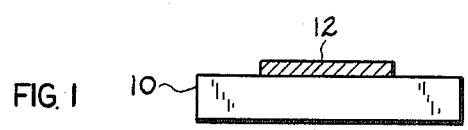
FIGS. 1–9 are simplified side elevation, sectional views of a dielectric substrate being processed to form an exemplary capacitive pressure transducer in accordance with the invention.
Figure 2:
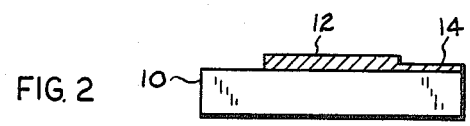

Referring now to FIG. 1, a dielectric substrate 10 of borosilicate glass has a conductive layer 12 deposited in a central region thereof. In FIG. 2, an electrode 14 is also deposited from the central region to the periphery of the substrate. Although the thickness of the electrode 14 is shown thinner than the thickness of the central layer 12, it should be understood that they will ordinarily be the same thickness (although the electrode could be thicker than the central layer). The electrode is shown thinner to indicate that it is a fingerlike protrusion that emerges radially from the central layer and extends across the periphery of the substrate to the outer edge. If the substrate is circular and the conductive layer is concentrically positioned thereon, the electrode can be conceptualized in FIG. 1 as being a narrow strip emerging from the central conductor radiating out toward the periphery. The electrode provides an electrical connection from the conductive layer 12 to a user's external connection. It should be understood that the substrate and the central conductor need not be circular but may be of virtually any arbitrary shape including triangular, square, rectangular, or polygonal. It should also be understood that the sketches shown in FIGS. 1-11 are not to scale. In a typical device the conductive layer 12 of FIG. 1 is about 1,000 angstroms of chrome sputtered onto a ground and optically polished PYREX ® substrate about 1 mm thick. It should be understood that the deposition methods can vary widely over a range of techniques including sputtering (RF-diode, magnetron, and biased), chemical vapor deposition (CVD), plasma assisted CVD, and solid gelatin. The layer of chrome may be sputtered through a shadow-mask which blocks deposition in the peripheral area and only allows metal to form in the central region. Or, the entire surface may have chrome deposited thereon, and the chrome can be rinsed away from the peripheral regions using the photo-resist method (light is permitted to strike and catalyze the photo-resist material which fuses it in place; the other portion is then etched away by an acid and the photo-resist is rinsed off). It should also be understood that although the fabrication of only a single device is shown in FIGS. 1-9, the method shown is particularly well suited for fabricating a large number of devices at one time.

Figure 3:
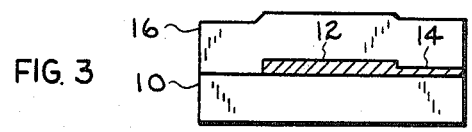

In FIG. 3, several microns of borosilicate glass are deposited on the substrate over the previously deposited conductive layer 12 and the electrode 14. The sputtering is done with an oxygen reactive atmosphere, for example, 25 percent oxygen—75 percent argon. To ensure that the glass is sufficiently oxidized to take full advantage of the borosilicate properties, e.g. dielectric and expansion coefficients, the deposited layer is annealed by exposure to steam at elevated temperatures, on the order of 555° C., for one hour. Annealing saturates the glass to provide a "wet" glass layer. This "relaxes" the glass and promotes a better field assisted bond of the glass to the silicon diaphragm to be attached later. However, it should be understood that the oxygenation and annealing are not absolutely necessary for a commercially viable device.

Following annealing, a thin chrome layer 18 (FIG. 4) is sputtered over the "wet" glass to a thickness of approximately 1,000 angstroms. This chrome layer is used at an etching mask in a later step.

Figure 4:
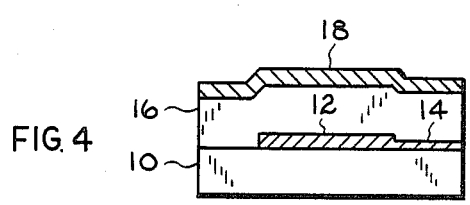
Figure 5:
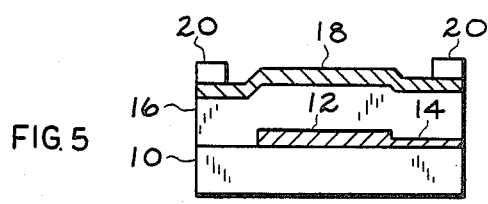
Figure 6:
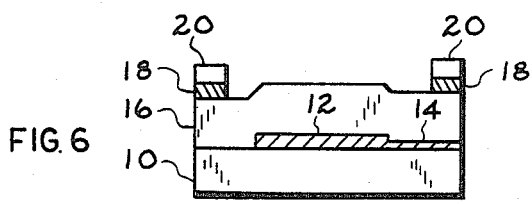

A narrow band 20 (FIG. 5) of photo-resist material is deposited around the periphery of the device. In FIG. 6 the chrome layer 18 of FIG. 4 is etched away except in the outer periphery region under the photo-resist band 20.

Figure 7:
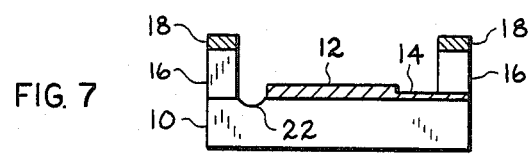
Figure 8:
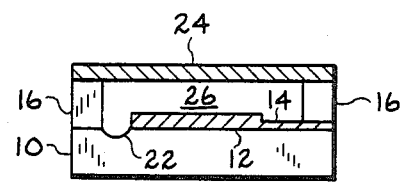
Figure 9:
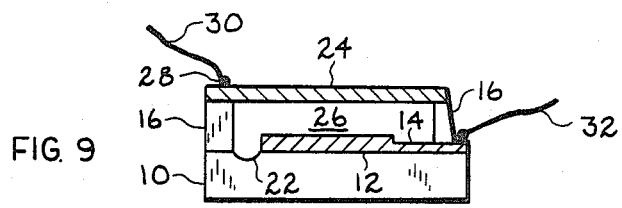

The device is then exposed to hydrofluoric acid or can be dry etched by which a well is etched in the borosilicate glass 16 as shown in FIG. 7. As may be seen in FIG. 7, the photo-resist material 20 of FIG. 6 has been dissolved or lifted off in the hydrofluoric acid, but the chrome band 18 has blocked the hydrofluoric acid on the periphery and a wall 16 (the remains of the borosilicate glass deposited in FIG. 3) remains forming sides of the well. After the well is etched the chrome band 18 is removed using sulfuric acid or a similar acid. It should be observed that since the original conductive layer 12 was deposited in FIG. 1 in such a manner as to cover only a relatively small central area of the substrate 10, and since the chrome band 18 masks only a narrow peripheral band, a gap exists on the substrate between the conductive layer 12 and the well wall 16. Thus, the etching process of FIG. 7 may cause a small amount of etching to take place in the underlying substrate 10 which forms a moat 22 between the wall 16 and the conductive layer 12. The moat is etched all around the conductive layer except where the electrode 14 traverses the space between the electrode 12 and the outer periphery of the substrate 10. The gap between the rigid plate and the glass wall is desirable because it optimizes the electrical performance characteristics of the device. The ratio of the plate diameter to the well diameter is a variable in the equations which determine the base capacitance and the rate of change of capacitance at discrete points in the working pressure range of the device.

It should be understood that the original conductive layer 12 could have been deposited in FIG. 1 in such a manner that a relatively large central area of the substrate 10 was covered, such that the well walls 16 butt up against the central conductive layer. In such a case, it would be desirable, but not absolutely necessary for the practice of the invention, to etch away a portion of the periphery of the central conductive surface between the central conductive surface and the well wall.

After the chrome band 18 is removed from the top of the walls 16, a doped silicon diaphragm 24 is electrostatically bonded using the known field assisted sealing technique of joining glass to semiconductors. The technique involves subjecting the device to approximately 300°-500° C. to induce ionic mobility within the borosilicate glass utilized. For example, PYREX ®(Corning 7740) glass has about 2.5 percent $NA_2O_3$ as a constituent part which provides extremely mobile sodium ions at high temperature which may be used in the technique. Similarly, Corning 7070 glass has lithium ions available at high temperature which may also be used in the technique. After being heated and reaching a high degree of conductivity, the glass-semiconductor junction is subjected to an electric field on the order of 100 volts DC which produces a depletion layer at the interface between the silicon and the glass. If the field is properly directed, the positive sodium or lithium ions drift away from the interface and a high field is created across this interface causing intimate contact between the glass and the silicon. In this manner a hermetic seal between the semiconductor and the borosilicate glass is formed. A thin conductive layer of metal may be applied to the back surface of the glass base (10) in order to provide a good electrical contact during the bonding process. Thus, a hermetic seal between the semiconductor and borosilicate glass is formed. It should be noted that the above-described process is normally accomplished in vacuum in order to provide an absolute pressure sensor. However, it should be understood that the hermetic sealing process can be carried out in any pressure environment such that the pressure range of the device can be altered. Also, exposing this vacuum cavity to a second pressure source creates a differential pressure sensor.

In any event, the field assisted bonding process provides an extremely strong seal and a resulting closed chamber 26 is formed having the diaphragm 24 as a top, the substrate 10 as its bottom, and the glass walls 16 as its sides. The conductive diaphragm 24 opposes, in parallel plate capacitive fashion, the conductive layer 12. The diaphragm thickness is selected to provide the proper amount of deflection for the pressure range to which it is to be subjected in order to provide a corresponding range of capacitance values in the device.

For example, a 0 to 2.7 Atmosphere device with a diaphragm thickness of 0.196. mm, a vacuum cavity diameter of 0.483 cm, and a distance between the diaphragm and conductive surface 12 of 0.002 mm, the capacitance will vary from approximately 58 picofarrads up to 133 picofarrads over the pressure range. The distance between the diaphragm and the conductive surface can be increased; however, between 0.002 and 0.004 mm is considered optimum.

Once the field assisted bonding process is completed, a portion of the outer periphery of the device is etched away in order to expose part of the electrode 14 so that an external connection may easily be made. A conductive metal layer or pad of nickel, gold, aluminum, etc., may then be deposited and alloyed on the external surface of the diaphragm 24 to provide electrical connection. External leads 30, 32 are then soldered, welded, or otherwise attached onto the connection points and the device is ready for use in an external circuit (not shown).

Figure 10:
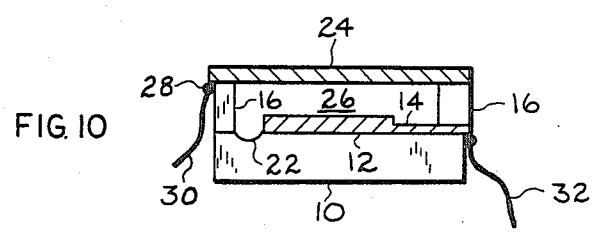
FIGS. 10 and 11 are simplified side elevation views of alternative embodiments of pressure transducers employing the present invention.

It should be understood that the deposition of electrical contacts for external connection can be made in a large number of different ways including the method shown in FIG. 10.

Figure 11:
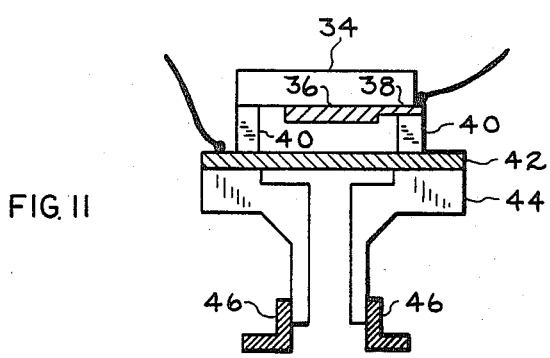

It should also be understood that the precise configuration illustrated in FIGS. 1-10 is not the only way of practicing the invention. For instance, in FIG. 11 is illustrated a sensor according to the present invention in which a substrate 34, a conductive layer 36, an electrode 38, a glass wall 40 around the periphery of the device, and a diaphragm 42 are assembled in the manner described above in connection with FIGS. 1-9. In addition, the diaphragm is also bonded to a silicon or glass pedestal 44 which is in turn attached to metal footings 46 by means of a eutectic or glass-to-metal seal.

In all of the pressure sensors fabricated in accordance with the present invention, the parasitic capacitance in parallel with the variable capacitance between the capacitive plates is minimized. For example, if the capacitance between the diaphragm and the metal layer is on the order of 50-100 picofarrads, the parasitic capacitance electrically connected in parallel with this variable capacitance will be on the order of 5 picofarrads, or about 1/20 to 1/10 of the varying capacitance. It should be understood that the conductive silicon diaphragm 24 need not be doped, but can instead have a layer of metal deposited thereon to form a capacitive plate. For example, the entire underside of the diaphragm, i.e., the side within the cavity, may be coated with a metal. The field assisted bonding technique would be carried out in a manner similar to that described above except, in this case, the bonding would be between metal and glass. However, this method would be disadvantageous from the point of view of introducing undesirable mechanical hysteresis in the joints.

Although the invention has been shown and described with respect to exemplary embodiments thereof, it should be understood by those skilled in the art that the foregoing and various other changes, omissions and additions may be made therein and thereto, without departing from the spirit and the scope of the invention.

I claim:

1. A capacitive pressure sensor, comprising:
    a thick glass dielectric substrate having a conductive surface formed on a central region thereof with a narrow electrode extending radially outward therefrom;
    a thin, doped silicon diaphragm; and
    a wall of glass joining said glass dielectric substrate to said silicon diaphragm and providing a chamber between said substrate, said diaphragm, and said wall; the central conductive surface on said substrate being spaced at a distance from said diaphragm, forming the plates of a capacitor, said distance and therefore the capacitance of said capacitor varying in response to changes in fluid pressure external to said sensor.

2. The method of fabricating a pressure sensor of the type providing a capacitive indication of pressure, comprising the steps of:
    forming an electrically conductive surface and an associated electrode on a surface of a glass dielectric substrate;
    forming a layer of glass dielectric on said glass dielectric substrate, said conductive surface and said electrode;
    creating a cavity in said glass dielectric layer over said conductive surface;
    anodically sealing said cavity with an electrically conductive doped semiconductor diaphragm having a flexing portion which covers said cavity in opposition to said conductive surface and which flexes in response to differences in pressure between the pressure in the cavity and the environment outside the sensor for providing a variable capacitance between said diaphragm and said conductive surface in response to said differences in pressure.

* * * * *